United States Patent [19]
Breyfogle, III et al.

[11] 3,936,056
[45] Feb. 3, 1976

[54] SPINDLE DEPRESS/BRAKE MECHANISM

[75] Inventors: Forrest Wesley Breyfogle, III, Austin; James Dudley Bruer, Leander, both of Tex.

[73] Assignee: International Business Machines Corporation, Armonk, N.Y.

[22] Filed: Mar. 17, 1975

[21] Appl. No.: 559,351

[52] U.S. Cl. ............... 274/9 B; 274/39 A; 360/86
[51] Int. Cl.² .................... G11B 25/04; G11B 3/62
[58] Field of Search ........ 274/9 B, 39 A, 105, 42 R, 274/10 R; 360/86, 88, 97, 98, 99, 101, 133, 135, 137, 107; 346/137; 179/100.1 DR

[56] References Cited
UNITED STATES PATENTS

| | | | |
|---|---|---|---|
| 2,905,475 | 9/1959 | Checseboro | 274/9 B |
| 2,943,861 | 7/1960 | Redfield | 274/9 B |
| 3,789,160 | 1/1974 | Bruer | 360/86 |
| 3,836,731 | 9/1974 | Wilisch | 360/135 |
| 3,867,724 | 2/1975 | Bruer | 274/39 A |

*Primary Examiner*—Richard E. Aegerter
*Assistant Examiner*—A. J. Mirabito
*Attorney, Agent, or Firm*—John W. Henderson, Jr.

[57] ABSTRACT

Spindle depress/brake apparatus in a disc dictation machine for depressing the record/playback spindle during a disc change cycle and for inhibiting rotational motion of the spindle after a new disc is loaded until the spindle properly engages a phasing slot in the disc. The apparatus includes a pivotally mounted bellcrank resiliently biased in a non-spindle depress direction. The bellcrank includes a Y-shaped first end engaging the spindle having a tooth for inhibiting rotation of the spindle and a second end which includes a cam surface, a mechanical latch and an adjustable stop. The spindle depress/brake apparatus is actuated by motion of the disc change loader carrier mechanism in the machine.

3 Claims, 6 Drawing Figures

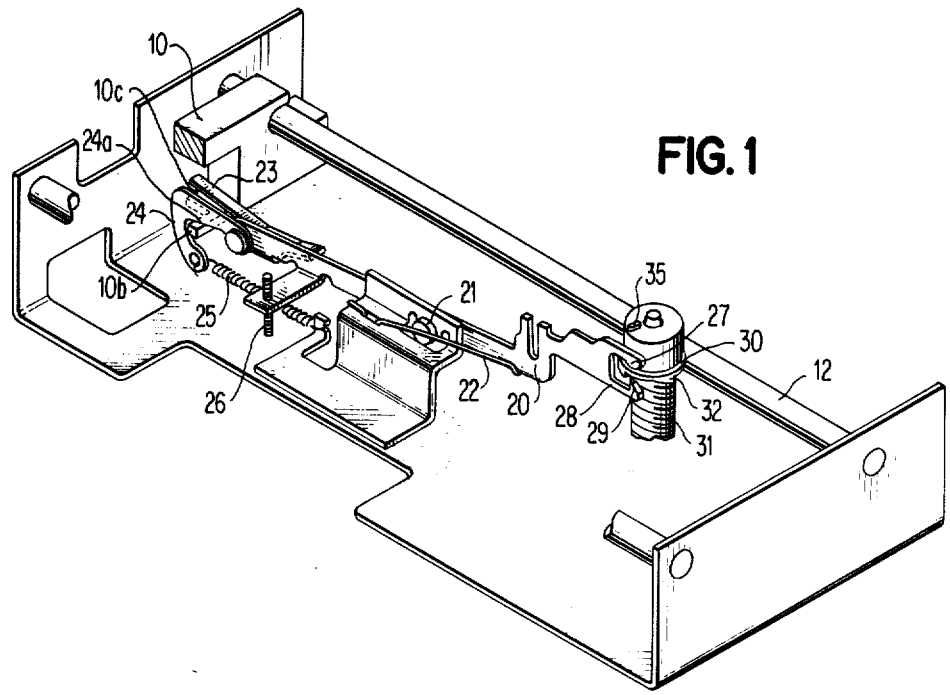
FIG. 1
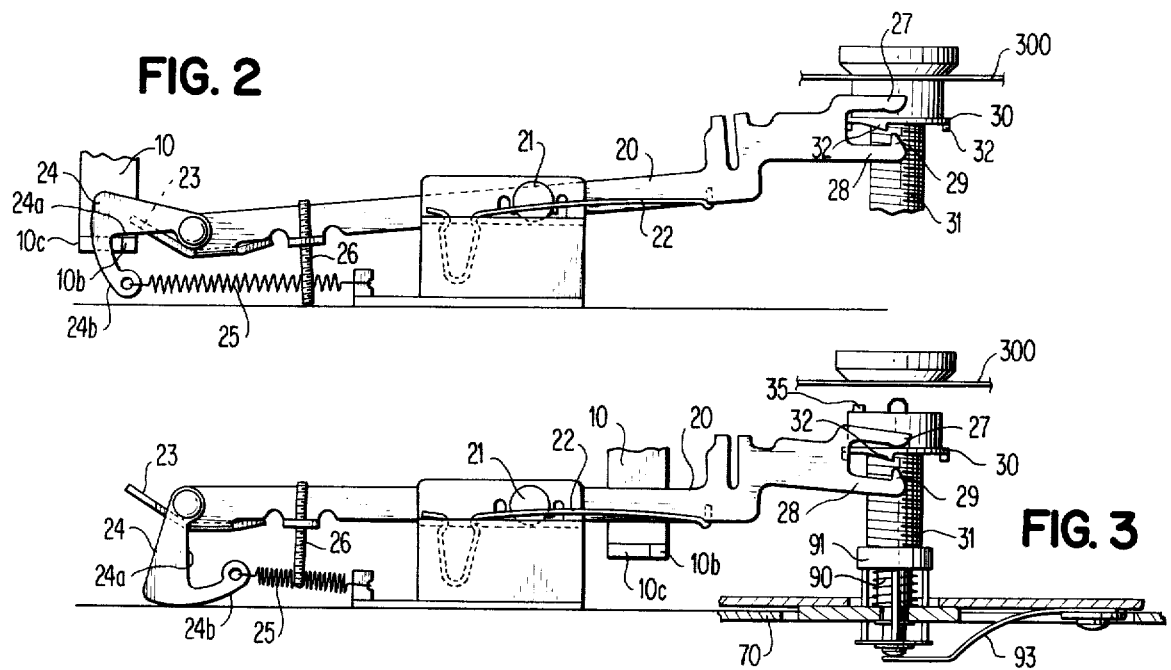
FIG. 2
FIG. 3
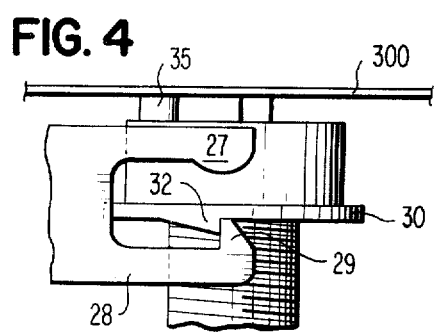
FIG. 4
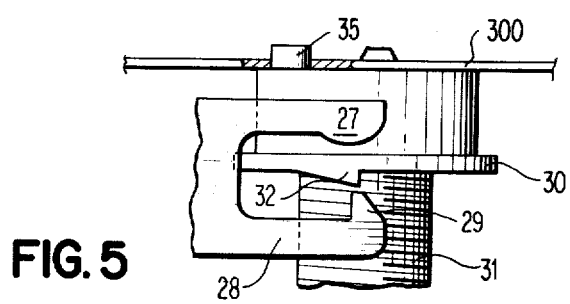
FIG. 5

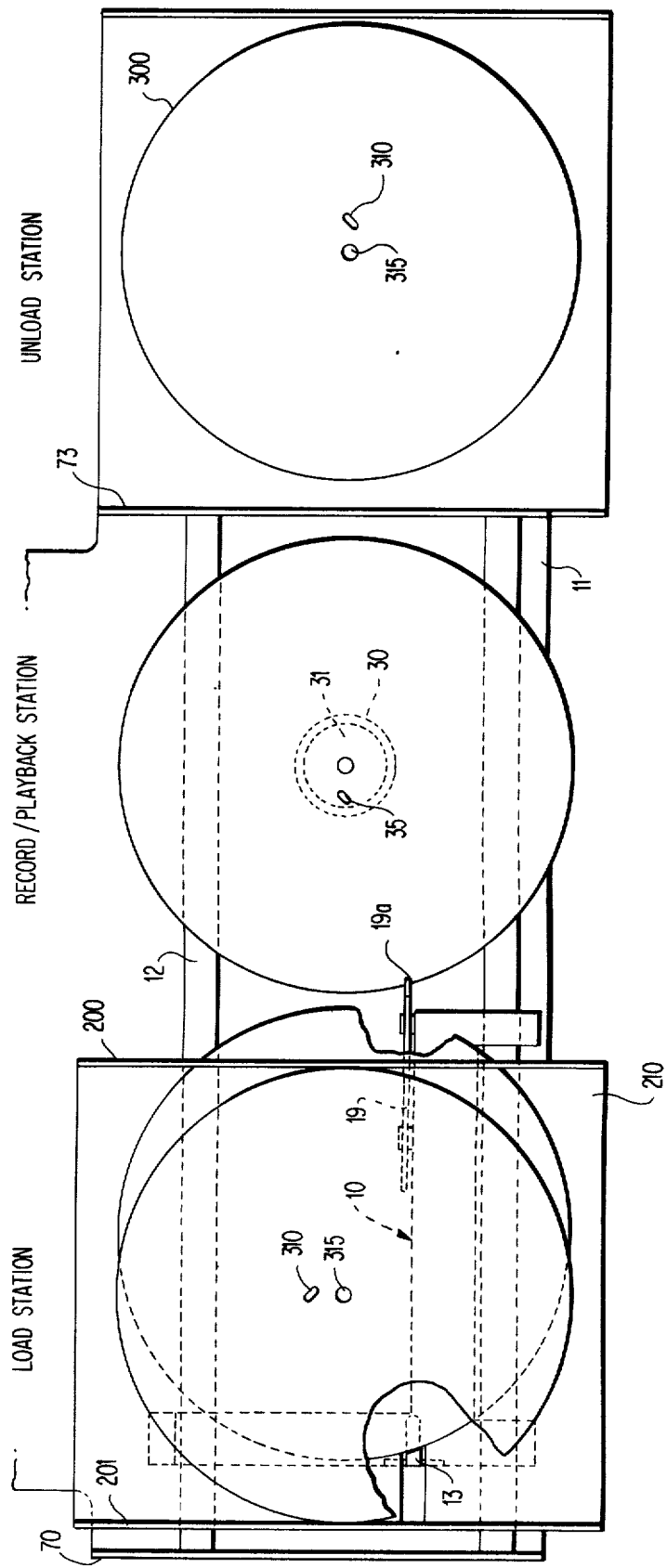

3,936,056

SPINDLE DEPRESS/BRAKE MECHANISM

CROSS REFERENCE TO RELATED APPLICATIONS

U.S. Pat. application Ser. No. 423,029, filed Dec. 10, 1973, entitled "Head Drive Apparatus," having James D. Bruer, et al., as the inventor, now U.S. Pat. No. 3,867,724, issued Feb. 8, 1975, and assigned to the present assignee.

U.S. Pat. application Ser. No. 209,800, filed Dec. 20, 1971, entitled "Dictation Apparatus with Disc Loading, Feeding and Ejecting Feature", now U.S. Pat. No. 3,789,160, issued Jan. 29, 1974, to J. D. Bruer, D. L. Buddington and W. F. Klien and assigned to the instant assignee.

U.S. Pat. application Ser. No. 265,841, filed June 23, 1971, entitled "Recording Media Orientation," now U.S. Pat. No. 3,797,035 issued Mar. 12, 1974 to R. E. Hunt and L. H. Robbins and assigned to the present assignee.

U.S. Pat. application Ser. No. 559,352, filed Mar. 17, 1975, entitled "Loader Carrier Mechanism" having J. D. Bruer as the inventor and assigned to the present assignee.

BACKGROUND OF THE INVENTION

1. Field of the Invention

This invention relates to disc recording and transcribing apparatus, in general, and more specifically, to apparatus for depression of the spindle during a disc change cycle and inhibiting motion of the spindle during phasing of a loaded disc.

2. Description of the Prior Art

Representative of the prior art is U.S. Pat. No. 3,789,160 entitled "Dictation Apparatus with Disc Loading, Feeding and Ejecting Feature," issued to J. D. Bruer, et al., Jan. 24, 1974, which discloses a disc dictation system featuring automatic loading, feeding and unloading operations wherein the spindle is depressed during a disc change cycle. The prior art spindle depress mechanism comprises a bellcrank pivotally mounted and having fingers engaging the depress surface of the spindle. The disc change loader carrier assembly includes a cam member which runs the length of the loader carrier and engages the spindle depress bellcrank for actuation thereof. The cam member comprises a short radius and a flat surface that runs the rest of the length of the loader carrier. As the loader carrier moves in a disc load direction, the spindle depress cam surface engages the bellcrank and rotates it to depress the spindle. The bellcrank rides on the cam surface during the entire disc change cycle.

Contact between the spindle depress bellcrank and the loader carrier spindle depress cam surface during the entire disc change cycle places a frictional "drag" on the loader carrier reducing its efficiency of operation. Furthermore, since the spindle is held down by contact between the bellcrank and the cam surface, the cam surface must be smooth or the spindle will vibrate up and down as the loader carrier moves through the load cycle producing a detrimental effect on the proper loading of the disc. Also, the constant frictional contact between the bellcrank and the cam surface results in wear of the surfaces requiring periodic readjustment of the mechanism to maintain a constant spindle depression height.

OBJECTS OF THE INVENTION

It is an object of the present invention to eliminate frictional drag on the loader carrier by the spindle depress mechanism during the disc change cycle.

It is another object of the present invention to hold the spindle at a constant height during the disc change cycle.

It is a further object of the present invention to substantially eliminate the need for readjustment of the spindle because of wear of the spindle depress parts.

BRIEF DESCRIPTION OF THE DRAWINGS

FIG. 1 is an illustration of the spindle depress/brake mechanism of the present invention.

FIG. 2 is a side view showing the spindle depress/brake mechanism in the undepressed position.

FIG. 3 is a side view showing the spindle depress/brake mechanism in the depressed position.

FIG. 4 is a close up illustration engagement of the brake with the spindle during phasing of the disc.

FIG. 5 is a close up showing the position of the spindle depress/brake after phasing is completed.

FIG. 6 is a plan view of the dictation machine showing disc change motion.

DETAILED DESCRIPTION

FIG. 1 illustrates a spindle depress/brake mechanism for use in a disc dictation machine of the type disclosed in U.S. Pat. No. 3,789,160, having a load station, a record/playback station, and an unload (eject) station arranged in a linear arrangement to facilitate straight line feeding of disc record members during operation of the apparatus. As can be seen in FIG. 6, a loader carrier assembly 10 executes a disc change cycle by concurrently transferring a first disc from the record/playback station into the unload station and transferring a second disc from the load station into the record/playback station of the dictation machine. The spindle depress/brake mechanism operates in conjunction with motion of the loader carrier 10 which is fully disclosed in U.S. Pat. application Ser. No. 559,352, filed Mar. 17, 1975, by J. D. Bruer, and assigned to the instant assignee, to actuate a spindle of the type disclosed in U.S. Pat. No. 3,867,724, entitled "Head Drive Apparatus," issued to J. D. Bruer, et al., and assigned to the instant assignee, during loading and unloading of a disc of the type disclosed in U.S. Pat. No. 3,797,035, entitled "Recording Media Orientation," issued to R. E. Hunt, et al., and assigned to the instant assignee.

Still referring to FIG. 1, in the preferred embodiment, the spindle depress/brake includes a bell-crank 20 pivotally mounted with the fulcrum at stud 21. The right end of the bellcrank 20 extends into the record/playback station of the dictation machine and includes fingers 27 and 28 which engage a depression flange 30 of the record/playback spindle 31. The lower finger 28 terminates in a vertical tooth 29. A spring 22 biases the bellcrank 20 in the counterclockwise direction to maintain the fingers 27 and 28 out of contact with the depression flange 30 of the spindle 31 during the normal record and playback operation. Spindle 31 is mounted on a tripod 91 whose legs extend into apertures in base plate 70. The tripod is biased by springs 90 and 93 which urge the spindle 31 upward as shown in FIG. 3.

The left end of the bellcrank 20 extends beneath the load station of the dictation machine. A mechanical latch 24 is rotatably attached to the left end of the bellcrank 20. The latch includes a spring actuation means 25. Surface 24b of latch 24 forms an arc which contacts baseplate 70. The arcuate surface 24b of latch 24 has an even-increasing radius so that the latch will lock in any position along the arcuate surface 24b to which surface 24b is rotated. Therefore, no adjustment is required for the locking motion of the latch 24. A cam surface 23 forms an integral part of the left end of the bellcrank 20. The cam surface 23 engages surface 10c of the loader carrier 10 to pivot the bellcrank 20 in the clockwise direction during movement of the loader carrier 10 from the leftmost home position toward the right. Adjustable stop 26 attached to the left end of bellcrank 20 is provided to adjust the height of fingers 27 and 28 so that they do not engage spindle 31 when the spindle depress/brake is in the undepressed position, as shown in FIG. 2.

Referring again to FIG. 1, surface 10b of the loader carrier 10 engages surface 24a of the latch 24 to unlock latch 24 when the loader carrier 10 returns to the home position at the end of a disc change cycle. Unlocking the latch 24 allows the spring 22 to bias bellcrank 20 in the counterclockwise direction and release the spindle 31 so that springs 90 and 93 can force it upward to engage a disc in the record/playback station.

OPERATION

Referring to FIG. 2, the spindle depress/brake mechanism is shown in the undepressed position. Latch 24 is in the unlatched position and spring 22 biases bellcrank 20 in the counterclockwise direction. Stop 26 is adjusted such that fingers 27 and 28 of bellcrank 20 clear depression flange 30 of the spindle 31. When a disc change cycle is initiated, the loader carrier 10 moves towards the right and surface 10c of the loader carrier 10 engages cam member 23 of bellcrank 20 and pivots bellcrank 20 in the clockwise direction around fulcrum 21. Finger 27 of bellcrank 20 engage depression flange 30 of spindle 31 and pushes spindle 31 downwards distorting springs 90 and 93 and disengaging the disc. The rotational motion of the bellcrank 20 causes arcuate surface 24b of latch 24 to rotate against the base plate 70 as spring 25 pulls latch 24 into the lock position holding the spindle down. Loader carrier 10 continues its translation along guide shaft 12 and surface 10c clears the cam 23 of bellcrank 20 as shown in FIG. 3.

When the loader carrier 10 returns towards the home position after transferring a new disc to the record/playback station above the depressed spindle 31, surface 10b of the loader carrier 10 engages surface 24a of the latch 24 and rotates the latch in the clockwise direction unlocking it and stressing spring 25. Unlocking of the latch 24 permits bias spring 22 to rotate the bellcrank 20 in the counterclockwise direction and allowing spindle 31 to rise under the force of springs 90 and 93. As the spindle rises, orientation member 35 comes into contact with the lower surface of the disc 300 and inhibits the upward motion of the spindle 31 until the orientation member 35 engages phasing slot 310 in the disc. If the orientation member 35 does not properly engage the phasing slot 310 in the disc, the counterclockwise bias on the bellcrank 20 will cause tooth 29 to engage lug 32 on the lower surface of depression flange 30 and inhibit rotational motion of the spindle 31. The disc 300 is rotated by a peripheral drive means (not shown) which engages the surface of the disc. As the disc 300 is rotated, the orientation member 35 engages the phasing slot 310 in the disc, permitting the spindle 31 to rise to its uppermost position. As shown in FIG. 5, when the orientation member 35 properly engages the disc the spindle 31 and the bellcrank 20 are in a relationship where the fingers of the bellcrank do not engage the depression flange 30 permitting the spindle to rotate freely. This mechanism provides an economical and reliable means of (1) removing the spindle from a used disc in order that the disc might be removed and another disc might be loaded into the record/playback station, (2) holding the spindle down during the loading and unloading of disc, (3) allowing the spindle to be inserted into the disc at the end of the change cycle, (4) holding the spindle stationary until the orientation member of the spindle finds the phasing slot in the disc, and (5) not restricting rotational motion of the spindle during record/playback functions on the dictation machine.

While the invention has been particularly shown and described with reference to a particular embodiment, it will be understood by those skilled in the art that various changes in form and detail may be made without departing from the spirit and scope of the invention.

What is claimed is:

1. In a disc dictation machine having a loader carrier for effecting a disc change cycle by ejecting a first disc from a record/playback station into an unload station and transferring a second disc from a load station into the record/playback station, apparatus for disengaging a disc in the record/playback station during the disc change cycle comprising:
   a spindle;
   a pivotally mounted bellcrank having one end thereof shaped for operatively engaging said spindle for depression thereof;
   cam means integral with the second end of said bellcrank;
   a first surface integral with said loader carrier for engaging said cam means and rotating said bellcrank to depress said spindle;
   latch means connected to the second end of said bellcrank lever;
   spring means connected to said latch means for actuation thereof to latch said bellcrank in the spindle position;
   a second surface integral with said loader carrier for engaging said latch means for unlocking thereof to release said spindle;
   spring means connected to said bellcrank lever for biasing said bellcrank lever out of contact with said spindle; and
   adjustable stop means attached to said second end of said bellcrank lever for inhibiting the motion of said bellcrank lever at a preselected non-spindle depression position.

2. The apparatus of claim 1 wherein said spindle includes integral lugs and said first end of said bellcrank lever further includes an integral tooth for engaging said lugs on said spindle to inhibit rotational motion of said spindle during phasing of a disc loaded into the record/playback station.

3. The apparatus of claim 1 wherein said latch means includes an arcuate surface of increasing radius for locking said latch at any position thereon.

* * * * *